(12) United States Patent
Ayari et al.

(10) Patent No.: US 8,949,279 B2
(45) Date of Patent: Feb. 3, 2015

(54) METHOD OF MANAGING MULTI-STREAM SESSIONS BETWEEN A TERMINAL AND A SERVER

(75) Inventors: Narjess Ayari, Lannion (FR); Denis Barbaron, Louannec (FR)

(73) Assignee: France Telecom, Paris (FR)

( * ) Notice: Subject to any disclaimer, the term of this patent is extended or adjusted under 35 U.S.C. 154(b) by 556 days.

(21) Appl. No.: 12/666,191

(22) PCT Filed: Jun. 25, 2008

(86) PCT No.: PCT/FR2008/051163
§ 371 (c)(1),
(2), (4) Date: Dec. 22, 2009

(87) PCT Pub. No.: WO2009/004267
PCT Pub. Date: Jan. 8, 2009

(65) Prior Publication Data
US 2010/0179968 A1 Jul. 15, 2010

(30) Foreign Application Priority Data
Jun. 29, 2007 (FR) ..................... 07 56191

(51) Int. Cl.
*G06F 7/00* (2006.01)
*G06F 17/30* (2006.01)
(Continued)

(52) U.S. Cl.
CPC ............ *H04L 67/06* (2013.01); *H04L 65/4007* (2013.01); *H04L 67/14* (2013.01)
USPC ......................................... 707/802

(58) Field of Classification Search
CPC ..... H04L 65/4007; H04L 67/06; H04L 67/14; H04L 12/5695; H04L 29/06027
USPC ................... 707/1/1, 802; 709/231, 217, 201, 709/227–228; 370/429; 706/45–46; 705/34, 705/40
See application file for complete search history.

(56) References Cited

U.S. PATENT DOCUMENTS 7,567,966 B2 * 7/2009 Burnett et al. ......................... 1/1
2005/0207443 A1 9/2005 Kawamura et al.
(Continued)

FOREIGN PATENT DOCUMENTS

WO 2005088929 A1 9/2005
WO 2006084503 A1 8/2006

OTHER PUBLICATIONS

English translation of the Written Opinion dated Mar. 10, 2009 for corresponding International Application No. PCT/FR2008/051163, filed Jun. 25, 2008.
(Continued)

*Primary Examiner* — Usmaan Saeed
*Assistant Examiner* — Cecile Vo
(74) *Attorney, Agent, or Firm* — David D. Brush; Westman, Champlin & Koehler, P.A.

(57) ABSTRACT

A method and apparatus are provided for managing sessions during which a terminal and a server exchange information blocks organized as a plurality of streams. The method includes storing in a data structure first data determined on the basis of an information block dedicated to signaling and coming from the terminal, the first data identifying the stream that transports the information block, the stream belonging to a session. The method further includes storing second data linked to the first data, the second data being determined on the basis of at least one other information block dedicated to signaling and transported by the same stream, the second data identifying the other stream or streams of the session.

17 Claims, 3 Drawing Sheets

(51) Int. Cl.
 *H04L 29/08* (2006.01)
 *H04L 29/06* (2006.01)
 *G06F 13/14* (2006.01)

(56) References Cited

U.S. PATENT DOCUMENTS

2006/0171392 A1 8/2006 Jen et al.

2007/0189319 A1* 8/2007 Yoo et al. ...................... 370/429
2008/0133767 A1* 6/2008 Birrer et al. ................... 709/231

OTHER PUBLICATIONS

International Search Report and Written Opinion dated Mar. 10, 2009 of corresponding International Application No. PCT/FR2008/051163, filed Jun. 25, 2008.

* cited by examiner

METHOD OF MANAGING MULTI-STREAM SESSIONS BETWEEN A TERMINAL AND A SERVER

CROSS-REFERENCE TO RELATED APPLICATIONS

This Application is a Section 371 National Stage Application of International Application No. PCT/FR2008/051163, filed Jun. 25, 2008 and published as WO 2009/004267 on Jan. 8, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of managing sessions during which a terminal and a server exchange blocks of information that are organized as a plurality of streams.

BACKGROUND OF THE DISCLOSURE

To access certain digital services, a client terminal must exchange information blocks with a server that provides the required service.

For some simple services, such as consulting a document via an HTTP (Hypertext Transfer Protocol) session, the information blocks transmitted are organized as a single stream. The session is then referred to as a single-stream session.

For other, more complex services, such as a video streaming service, the information blocks are organized as a plurality of streams, for example a stream transporting information blocks dedicated to signaling, a stream transporting payload data information blocks, and a stream transporting information blocks dedicated to control. The information blocks dedicated to signaling are used in particular to set up and to close a session and the payload data information blocks contain data linked to the required service. The information blocks dedicated to control are used to control the exchange of payload data information blocks. The session is then referred to as a multi-stream session.

An information block contains data that identifies the stream that transports it. It is therefore possible to identify the blocks that are part of the same stream from stream identification data in the information blocks. However, in the situation of a multi-stream session, this information is not sufficient to determine information blocks that belong to the same session. In the current state of the art it is therefore not possible to apply identical processing to all the information blocks belonging to the same session.

SUMMARY

An embodiment of the present invention proposes a method of managing sessions during which a terminal and a server exchange information blocks organized as a plurality of streams. The method includes storing in a data structure first data determined on the basis of an information block dedicated to signaling and coming from the terminal, said first data identifying the stream that transports said information block, said stream belonging to a session. The method further includes storing in the same data structure second data linked to said first data, said second data being determined on the basis of at least one other information block dedicated to signaling and transported by the same stream, said second data identifying the other stream or streams of the session.

Thus a link between the various streams belonging to the same session is established by means of the data structure. It is then possible to process identically all blocks belonging to the same session.

In particular non-limiting embodiments the method of the invention has the following additional features, separately or in combination:

The method includes determining the load on a set comprising at least one sever, storage of the first data in the data structure being conditioned by said load.

If the load on all the servers is too high, the information block containing the first data is not sent to all the servers. The first data is then either not stored or does not continue to be stored in the data structure.

The method includes selecting a server in the set of servers for said session and storing in said data structure third data linked to said first data and identifying the selected server.

Thus it is possible to send all information blocks belonging to the same session to the same server by means of the data structure.

An embodiment of the invention also relates to storage medium containing a data structure produced by executing a method as described above.

An embodiment of the invention further relates to network equipment for managing sessions during which a terminal and a server exchange information blocks organized as a plurality of streams, said equipment including means for storing first data determined on the basis of an information block dedicated to signaling and coming from the terminal, said first data identifying the stream that transports said information block, said stream belonging to a session. The network equipment also includes means for storing second data linked to said first data, said second data being determined on the basis of at least one other information block dedicated to signaling and transported by the same stream, said second data identifying the other stream or streams of the session.

In a first embodiment the network equipment includes means for determining the first data identifying the stream that transports said information block.

In another embodiment the network equipment includes means for determining the second data identifying the other stream or streams of the session.

An embodiment of the invention further relates to the use of a data structure produced by the method described above.

An embodiment of the invention further relates to a system for providing at least one service to a terminal, said system including at least one terminal and at least one server exchanging information blocks organized as a plurality of streams and a network equipment as described above.

An embodiment of the invention further relates to a computer program including instructions adapted to execute the method described above when said program is executed by a processor.

An embodiment of the invention also relates to an information medium containing such a computer program.

BRIEF DESCRIPTION OF THE DRAWINGS

The present disclosure can be better understood and other features and advantages become apparent after reading the following description given by way of example and with reference to the appended drawings.

DETAILED DESCRIPTION OF ILLUSTRATIVE EMBODIMENTS

An embodiment of the invention is described below in a particular application to a video streaming service. An embodiment of the invention applies equally to any type of service requiring a session during which a terminal and a server exchange information blocks organized as a plurality of streams, such as a voice over IP service or a file exchange service using the File Transfer Protocol (FTP).

Figure 1:
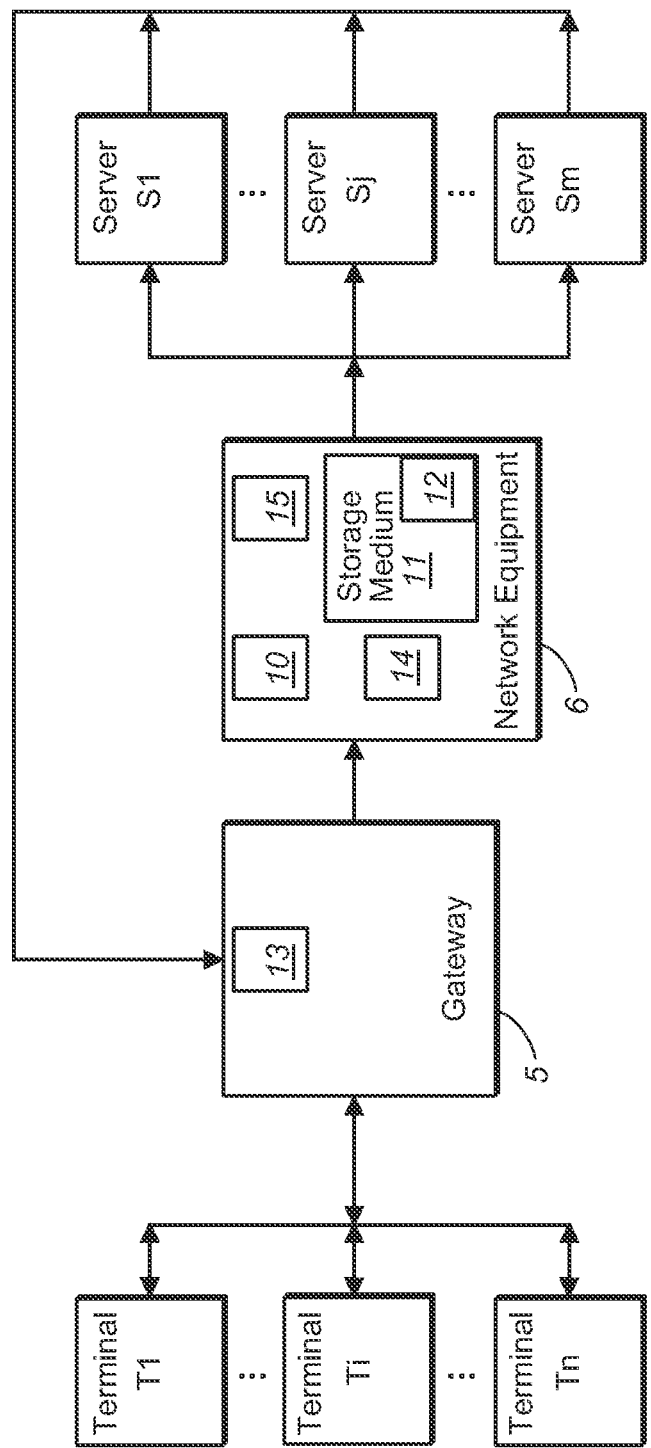
FIG. 1 is a diagram of an architecture of a system of an embodiment of the invention for providing a service to a user terminal.

FIG. 1 is a diagram of an architecture of a system 1 for providing at least one service to a terminal.

The system 1 includes n user terminals Ti where n is any integer and $1 \leq i \leq n$. The system also includes m servers Sj providing a service where m is any integer and $1 \leq j \leq m$.

A terminal Ti exchanges information blocks with a server Sj. Information blocks sent by the terminal Ti are referred to as uplink blocks. Conversely, information blocks sent by the server Sj are referred to as downlink blocks.

The system 1 further includes a gateway 5 for interconnecting the n terminals Ti and the m servers Sj.

Network equipment 6 is disposed between the gateway 5 and the m servers Sj. If m>1, the network equipment 6 is a node equipment located on the input side of the m servers Sj. This network equipment 6 in particular enables uplink information blocks to be sent to the correct servers Sj.

FIG. 1 shows an architecture in which downlink information blocks do not pass through the network equipment 6.

In this architecture, the network equipment 6 includes means 10 for determining from an uplink information block dedicated to signaling first data for identifying the session stream transporting said information block. This first data is then stored in a storage medium in a data structure 12. This medium can be any storage medium 11 such as a memory in which data can be written, read and erased in the data structure.

The gateway 5 includes means 13 for determining from at least one other information block dedicated to signaling and transported by the same stream second data for identifying the other stream or streams of the session. Either all the second data is present in this other information block or only part of the second data is present in said other information block. The missing second data is then deduced from the second data that is present in said other information block.

The second data is then transferred to the network equipment 6 and stored in the data structure 12.

Alternatively, the gateway 5 includes the means 10 for determining the first data in addition to the means 13 for determining the second data. The first data and second data are then transferred to the network equipment 6 and stored in the data structure 12.

The network equipment 6 also includes means 14 for determining the load on the set of m servers Sj.

The network equipment further includes means 15 for comparing the load on the set of m servers Sj with one or more thresholds.

Figure 2:
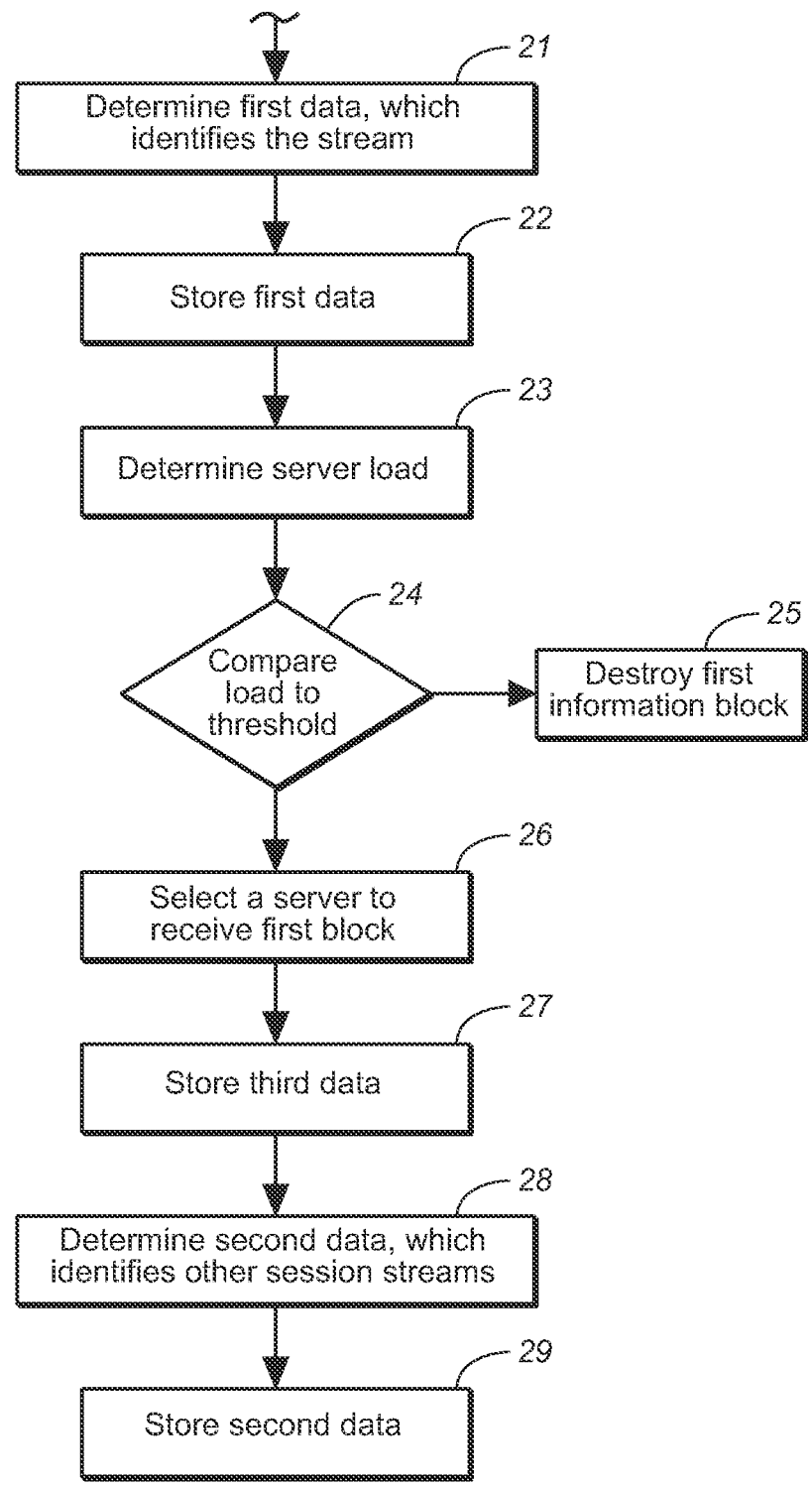
FIG. 2 is a diagram representing the steps of a session management method of an embodiment of the invention.

FIG. 2 is a diagram showing the steps of a session management method of an embodiment of the invention.

To exchange downlink information blocks between a server Sj and a terminal Ti, a session must first be set up between that terminal Ti and that server Sj. Setting up a session begins with the terminal Ti sending a first uplink information block to the network equipment 6. At this stage the session has not yet been set up. The first information block contains first data for identifying the stream transporting the first information block. This first data identifies the session stream transporting information blocks dedicated to signaling. If the terminal Ti and the network equipment 6 are connected to a data processing network using the Internet Protocol, the first data consists of an IP address of the terminal Ti, a port number of the terminal Ti, an IP address of the server Sj, a port number of the server Sj, and an indication of the transport level protocol used.

An IP address is a number for identifying any data processing hardware connected to a data processing network using the Internet Protocol.

A port is a point of access to an operating system of data processing hardware. It is identified by a port number.

A transport level protocol defines a set of procedures for controlling and regulating the exchange of information blocks between two entities of a communications network at the level of the transport layer of the TCP/IP stack. Two main protocols are used on the Internet, the User Datagram Protocol (UDP) and the Transmission Control Protocol (TCP). The former protocol operates in non-connected mode. This protocol provides no mechanism for verifying whether all the information blocks reach their destination. The latter protocol operates in connected mode and provides more reliable exchange of information.

The port number of the terminal Ti identifies the port used by the terminal Ti to send and receive information blocks dedicated to signaling. The IP address of the server Sj is a virtual IP address. This virtual IP address is common to the network equipment 6 and to the m servers Sj. The port number of the server Sj identifies the port used by the server Sj to send and receive information blocks dedicated to signaling. This port number is pre-assigned. Thus for a video streaming service using the Real Time Streaming Protocol (RTSP), the port number of the server Sj is 554, for example. For a telephony over IP service using the Session Initiation Protocol (SIP) as the signaling protocol, the port number of the service Sj is 5060, for example. For a file exchange service using the File Transfer Protocol (FTP), the port number of the server Sj is 21, for example.

The transport level protocol used depends on the required quality for the exchange of information blocks. For example, the TCP is used for exchanging signaling information blocks using the RTSP and the FTP. The UDP is used for exchanging information blocks using the SIP.

FIG. 2 is a diagram showing the steps of a session management method of an embodiment of the invention.

The first uplink information block is received by the network equipment 6. A first step 21 of the session management method determines from this first information block first data identifying the stream that transports said information block.

A step 22 stores the first data in the data structure 12 if said first data is not already stored in said structure.

A step 23 determines the load on the set of m servers Sj. For this purpose the determination means 14 collect information on the local loads of the various servers Sj.

By local load is meant for example the availability of the CPU in a server, the size of the reception queue of that server, the usage of the memory of the server, etc.

The load on the set of m servers Sj is determined from the local loads calculated periodically in the servers Sj, for example by weighting the mean value and the variance of the various calculated local loads.

Alternatively, the load on the set of m servers is determined from the local loads estimated in the servers Sj. For this purpose, a record of the local loads on the m servers Sj is stored for a given time interval. The local load on a server Sj is estimated as a function of that record.

Another option is for the load on the set of m servers to be determined from a combination of local loads calculated and estimated in the various servers Sj. Combining the calculated and estimated local loads minimizes the effect of load peaks occurring in the servers Sj. The makes the determination of the load on the set of m servers Sj more accurate.

Once the load on the set of m servers has been determined, it is compared in the step 24 to one or more predetermined thresholds. These thresholds can be either fixed or adjusted as a function of the load on the set of m servers Sj. This comparison conditions the admission of the first uplink information block to the m servers Sj. This prevents overloading of the set of m servers Sj and therefore sudden interruption of sessions already set up in the event of an overload. Setting up a session by transferring the first block to the set of m servers Sj is authorized only if the overall load on the set of m servers Sj allows this. Sessions already set up are therefore favored over sessions being set up in the event of overloading of the set of m servers Sj.

If the first uplink block is not sent because of the load on all of the m servers Sj, the first data is not retained in the data structure 12 and setting up the session is not accepted. The first information block is then destroyed in the step 25. This amounts to conditioning storage of the first data in the structure 12 by the loading that has been determined for the set of m servers Sj.

Alternatively, the step 23 is effected before the step 22 and the first data is stored only after the load on the set of m servers Sj has been calculated.

Another option is, for sending the first uplink block, to take account of the local load on the network equipment 6, in addition to the load on the set of m servers.

When the first block is sent to the m servers Sj, one of the servers is selected in the step 26 to receive it. The server selected has the lowest estimated local load or the lowest calculated local load.

In the step 27, third data linked to said first data is stored in the data structure 12. This third data identifies the selected server Sj.

The first block is then relayed to the selected server Sj by the network equipment 6. Various techniques can be used for this, such as IP-IP encapsulation or encapsulation of the link level of the information block.

When the selected server has received the first uplink information block, the session is set up. The terminal Ti and the server Sj can then exchange other blocks dedicated to signaling and transported by the same stream as the first uplink information block.

The step 28 determines second data identifying the other session streams from at least one other exchanged information block. The second data consists of the IP address of the terminal Ti, the virtual IP address of the server Sj, and an indication of the transport level protocol used.

These other streams include a stream transporting payload data information blocks. The second data then includes a port number used by the terminal Ti to exchange payload data information blocks transported by this payload data stream. The second data also includes a port number used by the server Sj to exchange payload data information blocks transported by the payload data stream.

Under some circumstances, the session also includes a stream dedicated to controlling the exchange of payload data information blocks. This stream transports control information blocks. Under such circumstances, the second data also includes the port numbers used by the terminal Ti and the server Sj to exchange control information blocks. In a first variant, these port numbers are present in the information block used in the step 28. In a second variant, these port numbers are deduced from the port numbers used to exchange signaling information blocks.

The second data linked to the first data is then stored in the data structure 12 in the step 29.

The information block or blocks used in the step 28 are dedicated to signaling and are transported by the same stream as the first information block.

In an RTSP context, a single downlink block is used containing a response to a specific set up request from the terminal. Analyzing this block determines the second data. The RTSP is described in RFC 2326.

In an SIP context, two information blocks are used. One of the blocks is an uplink block and contains a specific INVITE request and the other block is a downlink block and contains the response to that INVITE request. Analyzing these two blocks determines the second data. Analyzing the uplink block determines in particular the port number used by the terminal Ti to exchange payload data information blocks. Analyzing the downlink block determines the port number used by the terminal Sj to exchange payload data information blocks. The SIP is described in RFC 3261.

In the context of the FTP in passive mode, a downlink block is used containing an ENTERING PASSIVE MODE request. Analyzing this block determines the port number used by the server Sj to send and receive payload data information blocks. The FTP is described in RFC 959.

The steps of the session management method are advantageously executed by computer program instructions to constitute the data structure 12.

This program uses any programming language. It takes the form of source code, object code or a code intermediate between source code and object code, such as a partially-compiled form, or any other desirable form.

Moreover, this program is stored on an information medium. This information medium can be any entity or device capable of storing the program. For example, the medium can include storage means, such as a ROM, for example a CD ROM or a micro-electronic circuit ROM, or magnetic storage means, for example a floppy disk or a hard disk.

Alternatively, the information medium can be an integrated circuit incorporating the program, the circuit being adapted to execute or to be used in the execution of the session management method of an embodiment of the invention.

Once the first information block of a session has been admitted to the server Sj, the other uplink blocks of the session are admitted to the server Sj without applying access control. Alternatively, admitting the other uplink information blocks depends on the load on the set of m servers Sj, for example, with admission of the other information blocks then being controlled by the equipment 6.

Figure 3:
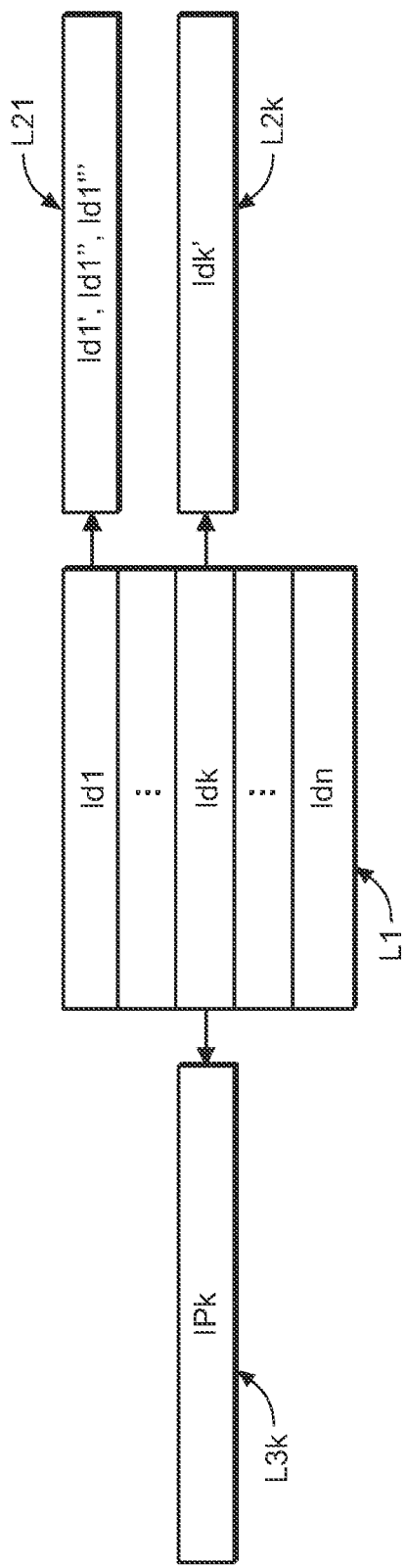
FIG. 3 is a representation of a data structure of an embodiment of the invention for storing data for identifying different streams belonging to the same session.

FIG. 3 shows an example of a data structure for storing data linked to the information blocks exchanged.

This data structure includes a first list L1 indexed by first data for identifying the various streams transporting information blocks dedicated to signaling.

The first data is entered in the list in the form of an identifier Idk during the step 22. This identifier can be an n-tuplet including the IP address of the terminal Ti, the virtual IP address of the server Sj, the port number of the terminal Ti, the port number of the server Sj, and the indication of the transport level protocol used.

Alternatively, the first data is entered in the list L1 in the form of the hashed n-tuplet. This limits the memory space occupied by said first data.

Each entry k from the list L1 is associated with only one session.

Each entry k from the list L1 references a second list L2k. The second list L2k is indexed by the second data for identifying the other stream or streams associated with the same session as the stream identified by the first data. This second data is stored in the structure during the step 29 in the form of one or more identifiers Idk', Idk'', Idk''', etc. according to whether there is one or more than one other associated streams.

Accordingly, this data structure 12 establishes a link between the various streams belonging to the same session.

Each entry k from the list L1 also references a third list L3k containing the third data. This third data identifies a server. That server is selected to receive all the information blocks exchanged during the session associated with the entry k from the list L1.

The third data is an internal address IPk identifying the server selected from the m servers Sj, for example The third data is written in the structure during the step 27 of the session management method.

The first, second, and third data associated with a session can be deleted in the data structure 12, in particular if the equipment 6 receives no information block belonging to that session during a predetermined period.

The data structure can be used to process information blocks received from a terminal and to go to a server.

This processing relays each uplink information block to the appropriate server Sj.

To this end each information block is analyzed to identify the data identifying the stream transporting said information block. This data consists of first data or second data from the list L1 or a list L2k.

If this data is an entry k from the list L1, it suffices to consult the associated list L3k to identify the server to receive the information block.

If the data is an entry from a list L2k, it suffices to consult the list L3k associated with the entry k from the list L1 to identity the server to receive the information block.

Thus it is possible, via the data structure, to send all the information blocks belonging to the same session to the same server Sj. The data structure then processes information blocks in a session aware mode.

The invention is not limited to the embodiments described above.

The uplink and downlink information blocks could pass through the network equipment 6. Thus this network equipment 6 could include the means 10 and 13 for determining the first and second data and the data structure 12. In this embodiment the first block could be relayed to the server Sj using a network address translation (NAT) technique.

Moreover, if there is only one server S1, the network equipment 6 could be integrated into the server S1, for example in the form of a module.

If different types of payload data must be exchanged between the terminal Ti and the server Sj, the session can include different streams transporting payload data information blocks. The different streams are then identified differently.

The different types of payload data can be different files or different parts of the same file, for example a video part and an audio part of the same file.

Although the present disclosure has been described with reference to one or more examples, workers skilled in the art will recognize that changes may be made in form and detail without departing from the scope of the disclosure and/or the appended or issued claims thereof.

The invention claimed is:

1. A multi-stream transmission method comprising:
   managing sessions during which a terminal and a server exchange information blocks organized as a plurality of different streams based on different types of information to which different ones of the information blocks are dedicated, wherein sessions already set up are favored over sessions being set up in an event of overloading of the server, the different types of information comprising:
      signaling information organized into signaling information blocks used to set up the sessions and to close the sessions; and
      payload information organized into payload data information blocks that are part of one or more a data files linked to one or more services provided by the server; and
   storing in a data structure:
      first data determined on the basis of an information block dedicated to signaling and coming from the terminal, said first data identifying a stream that transports said information block based on said information block being dedicated to signaling, said stream belonging to a session; and
      second data linked to said first data, said second data being determined on the basis of at least one other information block dedicated to signaling and coming from the server, said second data being transported by the same stream as said first data, said second data identifying another stream or streams of the session,
   wherein the other stream or streams transport information blocks other than information blocks dedicated to signaling,
   wherein the same stream that transports the information blocks dedicated to signaling and the other stream or streams that transport the information blocks other than the information blocks dedicated to signaling are linked together in the same session by the first data and the second data stored in the data structure,
   wherein the different streams are differentiated in the data structure by different data communication port identifiers.

2. The multi-stream transmission method according to claim 1, wherein said first data and said second data are stored in the data structure by an equipment between the terminal and the server.

3. The multi-stream transmission method according to claim 1, wherein said server forms part of a set comprising at least one server and said method includes determining a load on the set, and wherein storage of the first data in said structure is conditioned by said load.

4. The multi-stream transmission method according to claim 1, wherein said server forms part of a set comprising at least one server and said method includes:
   selecting a server in the set of servers for said session; and
   storing in said data structure third data linked to said first data and identifying the selected server.

5. Network equipment for managing multi-stream sessions during which a terminal and a server exchange information blocks organized as a plurality of different streams based on different types of information to which different ones of the information blocks are dedicated, the different types of information comprising:
  signaling information organized into signaling information blocks used to set up the sessions and to close the sessions; and
  payload information organized into payload data information blocks that are part of one or more a data files linked to one or more services provided by the server, and
  said equipment including:
  a storage medium; and
  a circuit configured to:
    determine first data on the basis of an information block dedicated to signaling and coming from the terminal and to store the first data in the storage medium, wherein said first data identifies a stream that transports said information block based on said information block being dedicated to signaling, and wherein said stream belongs to a session;
    store in said storage medium second data linked to said first data, said second data being determined on the basis of at least one other information block dedicated to signaling and coming from the server, said second data being transported by the same stream as said first data, said second data identifying another stream or streams of the session; and
    favor sessions already set up over sessions being set up in an event of overloading of the server,
  wherein the other stream or streams transport information blocks other than information blocks dedicated to signaling,
  wherein the same stream that transports the information blocks dedicated to signaling and the other stream or streams that transport the information blocks other than the information blocks dedicated to signaling are linked together in the same session by the first data and the second data stored in the storage medium,
  wherein the different streams are differentiated in the storage medium by different data communication port identifiers.

6. The network equipment of claim 5, wherein said server forms part of a set comprising at least one server and said circuit is configured to determine a load on the set, and to store the first data in said storage medium as conditioned by said load.

7. The network equipment of claim 5, wherein said server forms part of a set comprising at least one server and said circuit is configured to:
  select a server in the set of servers for said session; and
  store in said storage medium third data linked to said first data and identifying the selected server.

8. A method comprising:
  managing sessions during which a terminal and a server exchange information blocks organized as a plurality of different streams based on different types of information to which different ones of the information blocks are dedicated, wherein sessions already set up are favored over sessions being set up in an event of overloading of the server, the different types of information comprising:
  signaling information organized into signaling information blocks used to set up the sessions and to close the sessions; and
  payload information organized into payload data information blocks that are part of one or more a data files linked to one or more services provided by the server: and
  storing in a data structure:
    first data determined on the basis of an information block dedicated to signaling and coming from the terminal, said first data identifying a stream that transports the information block based on said information block being dedicated to signaling, said stream belonging to a multi-stream session; and
    second data linked to said first data, said second data being determined on the basis of at least one other information block dedicated to signaling and coming from the server, said second data being transported by the same stream as said first data, said second data identifying another stream or streams of the multi-stream session,
  wherein the other stream or streams transport information blocks other than information blocks dedicated to signaling, and
  wherein the same stream that transports the information blocks dedicated to signaling and the other stream or streams that transport the information blocks other than the information blocks dedicated to signaling are linked together in the same multi-stream session by the first data and the second data stored in the data structure;
  wherein the different streams are differentiated in the data structure by different data communication port identifiers; and
  using the data structure produced to process information blocks received from the terminal and to go to the server.

9. The method according to claim 8, wherein said first data and said second data are stored in the data structure by an equipment between the terminal and the server.

10. The method according to claim 8, wherein said server forms part of a set comprising at least one server and said method includes determining a load on the set, and wherein storage of the first data in said structure is conditioned by said load.

11. A system for providing at least one service to a terminal, said system comprising:
  at least one terminal and at least one server exchanging information blocks organized as a plurality of different streams based on different types of information to which different ones of the information blocks are dedicated, the different types of information comprising:
  signaling information organized into signaling information blocks used to set up the sessions and to close the sessions; and
  payload information organized into payload data information blocks that are part of one or more a data files linked to one or more services provided by the server; and
  network equipment between said at least one server and said at least one terminal and comprising:
    a circuit configured to store in a data structure first data determined on the basis of an information block dedicated to signaling and coming from the terminal, said first data identifying a stream that transports said information block based on said information block being dedicated to signaling, said stream belonging to a multi-stream session; and
    a circuit configured to store in the data structure second data linked to said first data, said second data being determined on the basis of at least one other information block dedicated to signaling and coming from the server, said second data being transported by the same stream as said first data, said second data identifying another stream or streams of the session:
  wherein the other stream or streams transport information blocks other than information blocks dedicated to signaling,
  wherein the same stream that transports the information blocks dedicated to signaling and the other stem stream or streams that transport the information blocks other than the information blocks dedicated to signaling are linked together in the same session by the first data and the second data stored in the data structure,
  wherein the network equipment favors sessions already set up over sessions being set up in an event of overloading of the server, and
  wherein the different streams are differentiated in the data structure by different data communication port identifiers.

12. The system of claim 11, wherein said server forms part of a set comprising at least one server and said circuit is configured to determine a load on the set, and to store the first data in said storage medium as conditioned by said load.

13. The system of claim 11, wherein said server forms part of a set comprising at least one server and said circuit is configured to:
  select a server in the set of servers for said session; and
  store in said storage medium third data linked to said first data and identifying the selected server.

14. A non-transitory information medium containing a computer program including instructions adapted to execute a method when said program is executed by a processor, wherein the method comprises:
  managing multi-stream sessions during which a terminal and a server exchange information blocks organized as a plurality of different streams based on different types of information to which different ones of the information blocks are dedicated, wherein sessions already set up are favored over sessions being set up in an event of overloading of the server, the different types of information comprising:
    signaling information organized into signaling information blocks used to set up the sessions and to close the sessions; and
    payload information organized into payload data information blocks that are part of one or more a data files linked to one or more services provided by the server: and
  storing in a data structure:
    first data determined on the basis of an information block dedicated to signaling and coming from the terminal, said first data identifying a stream that transports said information block based on said information block being dedicated to signaling, said stream belonging to a session; and
    second data linked to said first data, said second data being determined on the basis of at least one other information block dedicated to signaling and coming from the server, said second data being transported by the same stream as said first data, said second data identifying another stream or streams of the session,
  wherein the other stream or streams transports information blocks other than information blocks dedicated to signaling,
  wherein the same stream that transports the information blocks dedicated to signaling and the other stream or streams that transport the information blocks other than the information blocks dedicated to signaling are linked together in the same session by the first data and the second data stored in the data structure,
  wherein the different streams are differentiated in the data structure by different data communication port identifiers.

15. The non-transitory information medium according to claim 14, wherein said first data and said second data are stored in the data structure by an equipment between the terminal and the server.

16. The non-transitory information medium according to claim 14, wherein said server forms part of a set comprising at least one server and said method includes
  determining a load on the set, and wherein storage of the first data in said structure is conditioned by said load.

17. The non-transitory information medium according to claim 14, wherein said server forms part of a set comprising at least one server and said method includes: selecting a server in the set of servers for said session; and storing in said data structure third data linked to said first data and identifying the selected server.

* * * * *

UNITED STATES PATENT AND TRADEMARK OFFICE
CERTIFICATE OF CORRECTION

| | |
|---|---|
| PATENT NO. | : 8,949,279 B2 |
| APPLICATION NO. | : 12/666191 |
| DATED | : February 3, 2015 |
| INVENTOR(S) | : Narjess Ayari et al. |

It is certified that error appears in the above-identified patent and that said Letters Patent is hereby corrected as shown below:

In the claims

In claim 11, column 11, line 8, delete "stem".

Signed and Sealed this
Twelfth Day of April, 2016

Michelle K. Lee
*Director of the United States Patent and Trademark Office*